(12) United States Patent
Kupratis

(10) Patent No.: US 9,188,083 B2
(45) Date of Patent: Nov. 17, 2015

(54) GAS TURBINE ENGINE WITH AUXILIARY FAN

(75) Inventor: Daniel B. Kupratis, Wallingford, CT (US)

(73) Assignee: United Technologies Corporation, Hartford, CT (US)

( * ) Notice: Subject to any disclaimer, the term of this patent is extended or adjusted under 35 U.S.C. 154(b) by 1049 days.

(21) Appl. No.: 13/283,649

(22) Filed: Oct. 28, 2011

(65) Prior Publication Data

US 2013/0104523 A1    May 2, 2013

(51) Int. Cl.

| F02C 6/02 | (2006.01) |
|---|---|
| F02C 3/10 | (2006.01) |
| F02C 3/107 | (2006.01) |
| F02K 3/077 | (2006.01) |
| F02K 3/12 | (2006.01) |
| F02K 3/04 | (2006.01) |

(52) U.S. Cl.
CPC ... *F02K 3/12* (2013.01); *F02C 3/10* (2013.01); *F02C 3/107* (2013.01); *F02C 6/02* (2013.01); *F02K 3/04* (2013.01); *F02K 3/077* (2013.01)

(58) Field of Classification Search
CPC .............. F02C 6/02; F02C 3/10; F02C 3/107; F02K 3/077; F02K 3/04; F02K 3/06; F02K 3/062; F02K 3/065; F02K 3/12; B64C 29/0033; B64C 27/20; B64C 29/0025

USPC .............. 60/39.15, 791–792, 39.163, 39.183, 60/224, 225, 226.1, 226.3

See application file for complete search history.

(56) References Cited

U.S. PATENT DOCUMENTS

| 4,254,619 | A  | * | 3/1981 | Giffin et al. ................... 60/226.1 |
|---|---|---|---|---|
| 2003/0167750 | A1 | * | 9/2003 | Bornhoft et al. ............. 60/226.1 |
| 2004/0025493 | A1 | * | 2/2004 | Wojciechowski ............... 60/224 |
| 2006/0096272 | A1 | * | 5/2006 | Baughman et al. ............. 60/232 |
| 2007/0137214 | A1 | * | 6/2007 | Zewde et al. ................... 60/782 |
| 2008/0098719 | A1 | * | 5/2008 | Addis .......................... 60/226.1 |
| 2009/0211221 | A1 |   | 8/2009 | Roberge |
| 2010/0089019 | A1 |   | 4/2010 | Knight et al. |
| 2011/0056208 | A1 |   | 3/2011 | Norris et al. |

OTHER PUBLICATIONS

Inkster "History of Technology" 2006 Continuum.*
El-Sayed "Aircraft Propulsion and Gas Turbine Engines" 2008 Taylor and Francis Group LLC.*

* cited by examiner

*Primary Examiner* — Phutthiwat Wongwian
*Assistant Examiner* — William Breazeal
(74) *Attorney, Agent, or Firm* — Carlson, Gaskey & Olds, P.C.

(57) ABSTRACT

A propulsion system and a method of operating the propulsion system according to an exemplary aspect of the present disclosure includes powering an auxiliary fan with a gas turbine engine, the auxiliary fan along an auxiliary axis and the gas turbine engine along an engine axis, the auxiliary axis parallel to the engine axis.

7 Claims, 3 Drawing Sheets

GAS TURBINE ENGINE WITH AUXILIARY FAN

BACKGROUND

The present disclosure relates to gas turbine engines, and more particularly to a three-spool variable cycle gas turbine engine with an auxiliary fan.

Low observable aircraft tend toward tail-less flying-wing designs which provide an effective balance of aero-performance, payload integration and survivability. Such aircraft also typically embed the engines within the vehicle planform. Since the planform is relatively thin, especially in a "cranked kite" type vehicle toward the wing tips, the volume available to embed the engines may be less than adequate. This may result in bulges or other structures to bury the engines but may otherwise reduce optimal shaping.

SUMMARY

A propulsion system according to an exemplary aspect of the present disclosure includes a gas turbine engine along an engine axis and an auxiliary fan along an auxiliary axis parallel to the engine axis, the auxiliary fan driven by the gas turbine engine.

A propulsion system according to an exemplary aspect of the present disclosure includes a gas turbine engine with an intermediate spool along an engine axis. An auxiliary fan with an auxiliary spool along an auxiliary axis parallel to the engine axis, the auxiliary fan driven by the gas turbine engine.

A method of operating a propulsion system according to an exemplary aspect of the present disclosure includes powering an auxiliary fan with a gas turbine engine, the auxiliary fan along an auxiliary axis and the gas turbine engine along an engine axis, the auxiliary axis parallel to the engine axis.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
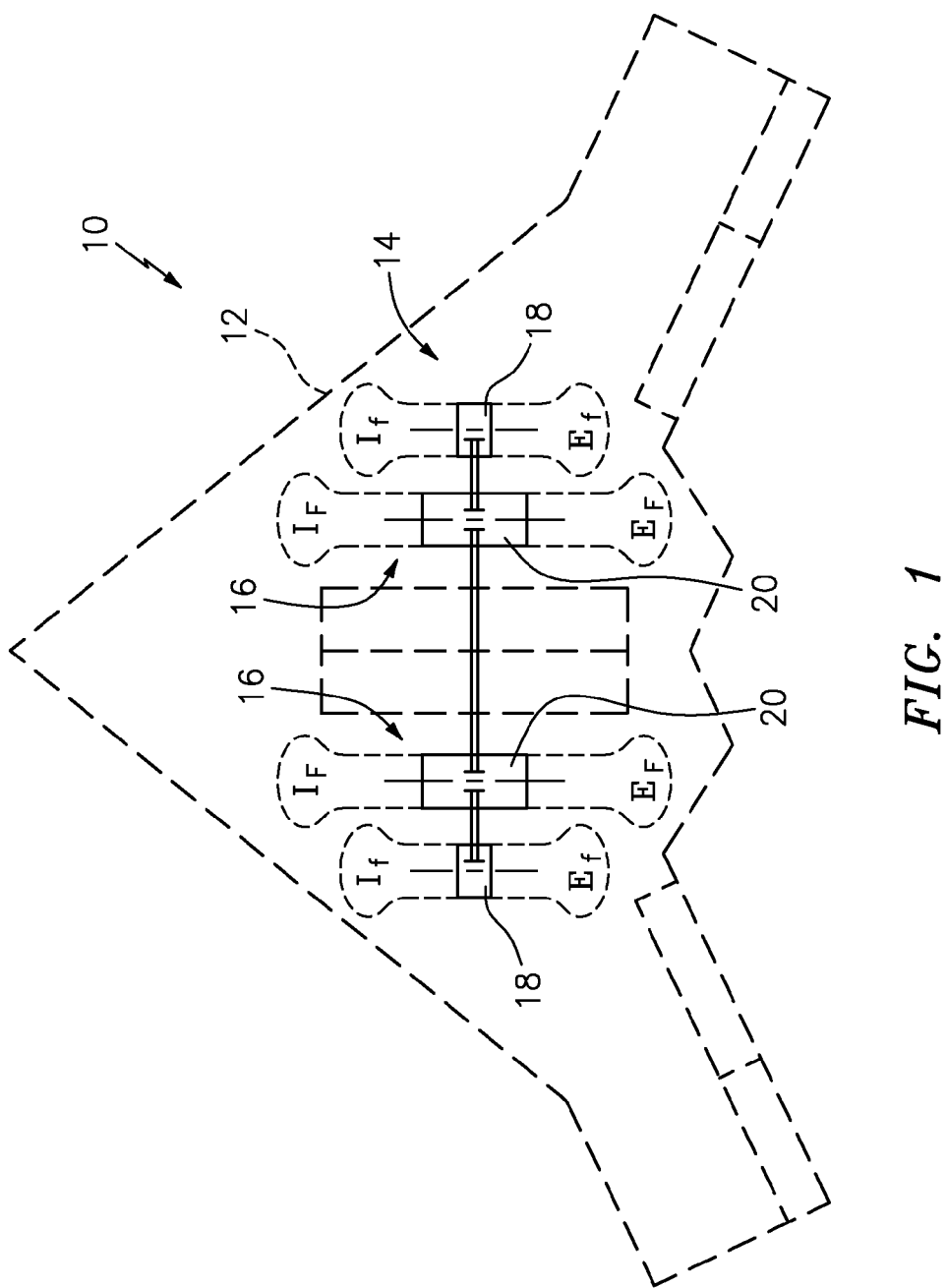
FIG. 1 is a general schematic plan view of an aircraft with a propulsion system that is embedded within the airframe according to one non-limiting embodiment.

FIG. 1 schematically illustrates an aircraft 10. The aircraft 10 in the disclosed non-limiting embodiment is schematically illustrated as a low observable (LO) aircraft of tail-less flying-wing "cranked kite" type vehicle, however, it should be appreciated that any aircraft will benefit herefrom and that the planform should not be considered limiting.

The aircraft 10 generally includes an airframe 12 and a propulsion system 14. The propulsion system 14 is a multi-powerplant system that is embedded within the airframe 12. Each powerplant 16 of the disclosed non-limiting embodiment includes a gas turbine engine 20 and an associated auxiliary fan 18 driven by the gas turbine engine 20. Each gas turbine engine 20 and auxiliary fan 18 of each powerplant 16 respectively requires a flow path between an inlet flow path $I_F$, $I_f$ and an exhaust flow path $E_F$, $E_f$ within the airframe 12.

Each flow path between the inlet flow path IF, If and the exhaust flow path EF, Ef are referred to herein as a "dog-bone." The dog-bone defines the space required of the airframe 12 for proper operation of the associated powerplant 16. The space available necessarily relatively decreases respectively toward the wing tips of the disclosed flying-wing "cranked kite" type vehicle which is typical of low observable aircraft. The auxiliary fan 18 requires a relatively smaller "dog-bone" $I_f E_f$ than that of the gas turbine engine 20 "dog-bone" $I_F$, $E_F$ and is thereby readily nested outboard of the gas turbine engine 20 toward the wing tips of the disclosed flying-wing "cranked kite" type vehicle.

The powerplant 16 disclosed according to the disclosed non-limiting embodiment provides essentially double the fan airflow within the same planform versus the conventional use of paired engines in a low observable aircraft. The doubling of airflow enables a lower pressure ratio for the auxiliary fan 18 and the gas turbine engine 20 which improves the propulsive efficiency at the same overall thrust level. The nested configuration also further facilitates an enlarged central bay.

Figure 2:
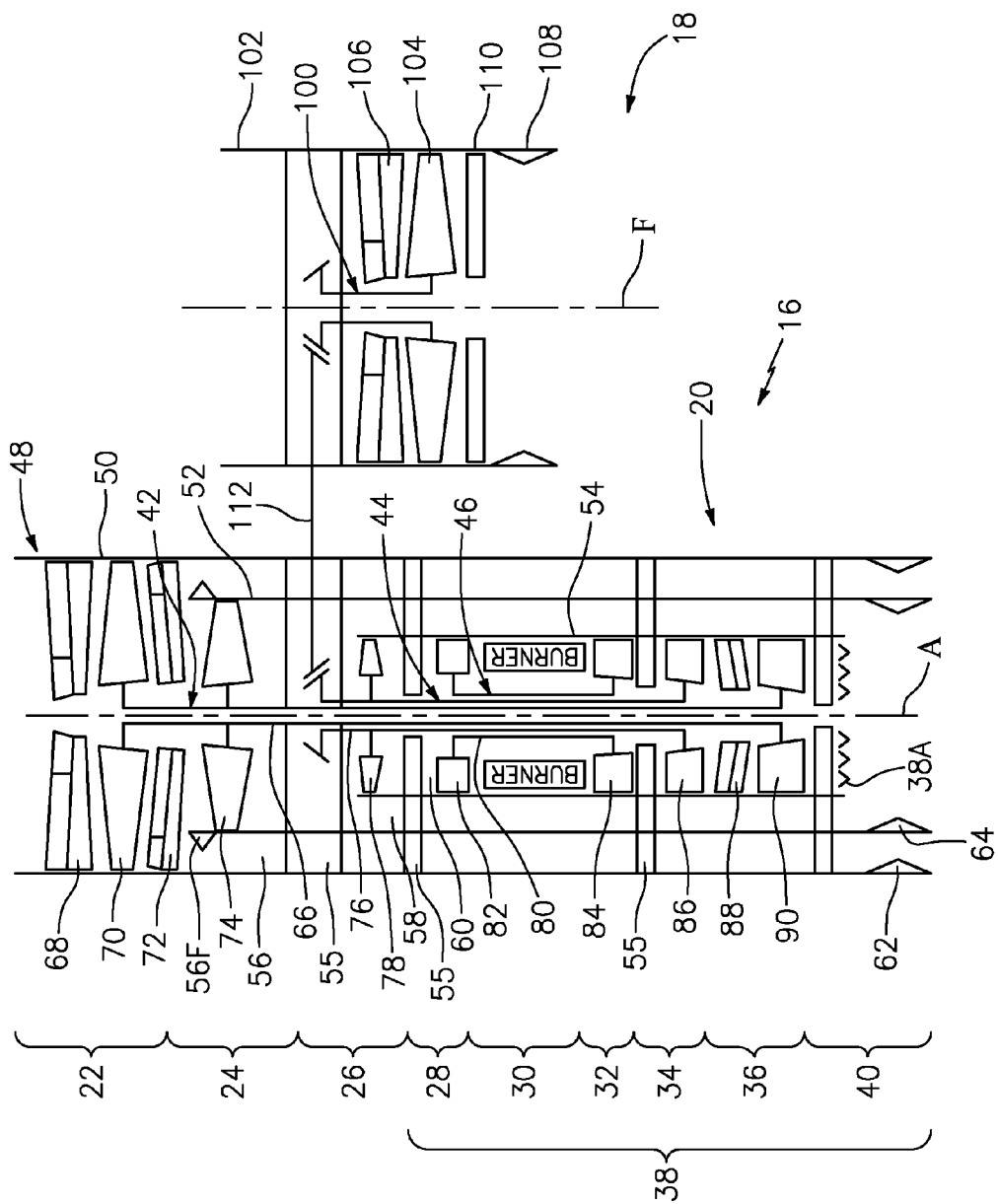
FIG. 2 is a schematic view of a powerplant with a gas turbine engine and an auxiliary fan of the propulsion system.

With reference to FIG. 2, the gas turbine engine 20 is disclosed herein as a variable cycle three-spool low bypass turbofan that generally includes a first stage fan section 22, a second stage fan section 24, an intermediate stage compressor section 26, a high pressure compressor section 28, a combustor section 30, a high pressure turbine section 32, an intermediate turbine section 34, a low pressure turbine section 36, a bypass duct section 38 and a nozzle section 40. Additional sections may include an augmentor section 38A among other systems or features such as a geared architecture. The sections are defined along a central longitudinal engine axis A.

The engine 20 generally includes a low spool 42, an intermediate spool 44 and a high spool 46 which rotate about the engine central longitudinal axis A relative to an engine case structure 48. The engine case structure 48 generally includes an outer case structure 50, an intermediate case structure 52 and an inner case structure 54. It should be appreciated that various alternative or additional structures individual or collectively inclusive of support struts 55 may define the case structures 50, 52, 54 to essentially define an exoskeleton that supports the spools 42, 44, 46 for rotation therein.

The first stage fan section 22 communicates fan flow through a flow control mechanism 56F into a third stream bypass flow path 56 as well as into a second stream bypass flow path 58, and a core flow path 60. The flow control mechanism 56F may include various structures such as pneumatic or mechanical operated blocker doors that operate as a choke point to define a variable area throat and selectively control flow through the third stream bypass flow path 56 such that a selective percentage of flow from the first stage fan section 22 is divided between the third stream bypass flow path 56 and both the second stream bypass flow path 58 and core flow path 60. In the disclosed non-limiting embodiment, the flow control mechanism 56F may choke the flow into the third stream bypass flow path 56 down to a minimal but non-zero flow.

The second stage fan section 24 communicates intermediate fan flow into the second stream bypass flow path 58 and the core flow path 60. The second stage fan section 24 is radially inboard and downstream of the flow control mechanism 56F such that all flow from the second stage fan section 24 is communicated into the second stream bypass flow path 58 and the core flow path 60.

The intermediate stage compressor section 26, the high pressure compressor section 28, the combustor section 30, the high pressure turbine section 32, the intermediate turbine section 34, and the low pressure turbine section 36 are in the core flow path 60. These sections are referred to herein as the engine core.

The core airflow is compressed by the first stage fan section 22, the second stage fan section 24, the intermediate stage fan section 26, the high pressure compressor section 28, mixed and burned with fuel in the combustor section 30, then expanded over the high pressure turbine section 32, the intermediate turbine section 34, and the low pressure turbine section 36. The turbines 32, 34, 36 rotationally drive the respective high spool 46, intermediate spool 44 and the low spool 42 in response to the expansion.

The third stream bypass flow path 56 is generally defined by the outer case structure 50 and the intermediate case structure 52. The second stream bypass flow path 58 is generally defined by the intermediate case structure 52 and the inner case structure 54. The core flow path 60 is generally defined by the inner case structure 54. The second stream bypass flow path 58 is defined radially inward of the third stream bypass flow path 56 and the core flow path 60 is radially inward of the second stream bypass flow path 58.

The nozzle section 40 may include a third stream exhaust nozzle 62 (illustrated schematically) which receives flow from the third stream bypass flow path 56 and a mixed flow exhaust nozzle 64 which receives a mixed flow from the second stream bypass flow path 58 and the core flow path 60. It should be appreciated that various fixed, variable, convergent/divergent, two-dimensional and three-dimensional nozzle systems may be utilized herewith.

The first stage fan section 22, the second stage fan section 24, and the low pressure turbine section 36 are coupled by a low shaft 66 to define the low spool 42. In the disclosed non-limiting embodiment, the first stage fan section 22 includes a first stage variable inlet guide vane 68, a first stage fan rotor 70, a first stage variable exit guide vane 72, and a second stage rotor 74. It should be appreciated that various systems may be utilized to activate the variable inlet and exit guide vanes. It should also be appreciated that other fan stage architectures may alternatively or additionally be provided such as various combinations of fixed and variable guide vanes.

The intermediate stage compressor section 26 and the intermediate pressure turbine section 34 are coupled by an intermediate shaft 76 to define the intermediate spool 44. In the disclosed non-limiting embodiment, the intermediate stage compressor section 26 includes an intermediate stage compressor 78. The intermediate stage compressor section 26 and the intermediate pressure turbine section 34 each may include a multiple of stages (illustrated schematically). It should be appreciated that the compressor architecture may alternatively or additionally include various combinations of fixed and variable intermediate stage variable inlet and exit guide vanes.

The high pressure compressor section 28 and the high pressure turbine section 32 are coupled by a high shaft 80 to define the high spool 46. In the disclosed non-limiting embodiment, the high pressure compressor section 28 upstream of the combustor section 30 includes a multiple of stages 82 (illustrated schematically). It should be appreciated that the high pressure compressor section 28 may alternatively or additionally include other compressor section architectures which, for example, include additional or fewer stages each with or without various combinations of variable and or fixed guide vanes.

The high pressure turbine section 32 in the disclosed non-limiting embodiment, includes a multiple of turbine stages 84 (illustrated schematically). It should be appreciated that the turbine section 32 may alternatively or additionally include other turbine section architectures which, for example, include additional or fewer stages each with or without various combinations of variable and or fixed guide vanes.

The intermediate pressure turbine section 34 in the disclosed non-limiting embodiment, includes an intermediate pressure turbine stage 86 (illustrated schematically). The intermediate pressure turbine section 34 is generally between the high pressure turbine section 32 and the low pressure turbine section 36 in the core flow path. It should be appreciated that the intermediate pressure turbine section 34 may alternatively or additionally include other turbine section architectures which, for example, include additional or fewer stages each with or without various combinations of variable and or fixed guide vanes.

The low pressure turbine section 36 in the disclosed non-limiting embodiment, includes variable low pressure turbine inlet guide vanes (LPT vanes) 88 upstream of a low pressure turbine rotor 90. The low pressure turbine section 36 is the last turbine section within the core flow path 60 and thereby communicates with the mixed flow exhaust nozzle 64 which receives a mixed flow from the second stream bypass flow path 58 and the core flow path 60. The augmentor section 38A among other systems or features may be located immediately downstream of the low pressure turbine section 36.

Air which enters the first stage fan section 22 is divided between the third stream bypass flow path 56, the second stream bypass flow path 58, and the core flow path 60 in response to a position of the flow control mechanism 56F. That is, bypass flow into the third stream bypass flow path 56 is controlled. The second stage fan section 24 is radially inboard and essentially downstream of the flow control mechanism 56F such that essentially all flow from the second stage fan section 24 is communicated into the second stream bypass flow path 58 and the core flow path 60. The variable LPT vanes 88 facilitate performance matching for the first stage fan section 22 and the second stage fan section 24 simultaneously to thereby maintain constant engine inlet flow while modulating engine thrust.

In addition, the first stage variable exit guide vanes 72 downstream of the first stage fan rotor 70 may include a variable pitch mechanism such as a variable pitch trailing edge flap 72T. The pitch change provided by the first stage variable exit guide vanes 72 facilitate a reduced articulation requirements for the LPT vanes 88, as well as the potential to utilize a fixed exhaust nozzle as the third stream exhaust nozzle 62.

The auxiliary fan 18 generally includes an auxiliary spool 100 which rotates about an auxiliary fan axis F relative to an auxiliary case structure 102. The auxiliary fan axis F is generally parallel to the longitudinal engine axis A.

The auxiliary spool 100 includes an auxiliary fan 104 which rotates relative to auxiliary variable inlet guide vanes 106 upstream of the auxiliary fan 104. It should be appreciated that other fan stages and architectures may alternatively or additionally be provided such as various combinations of fixed and/or variable inlet guide vanes and fixed or variable stators. Although a single auxiliary fan 18 is illustrated in the disclosed, non-limiting embodiment, it should be appreciated that multiple auxiliary fans 18 may in addition be driven by a single gas turbine engine 20.

An auxiliary nozzle section 108 is mounted to the case structure 102 downstream of the auxiliary fan 104 to receive auxiliary fan flow from an auxiliary duct 110. It should be appreciated that various fixed, variable, convergent/divergent, two-dimensional and three-dimensional nozzle systems may be utilized herewith.

A cross shaft 112 is geared between the intermediate spool 44 and the auxiliary spool 100 such that the auxiliary fan 18 is driven by the gas turbine engine 20. The cross shaft 112 is generally transverse to the axes A, F. It should be appreciated that various gear reductions and gear interfaces such as that typical of a towershaft may be provided by the cross shaft 112 to transfer power between the intermediate spool 44 and the auxiliary spool 100.

Generally, the first stage fan section 22 is speed matched to the second stage fan section 24 to minimize spillage drag. Thrust changes are primarily effected with control of the flow and pressure ratios through the second stream bypass flow path 58 with the intermediate spool 44.

The rate of fuel flow is the predominant effect on engine thrust performance, but the second after that is the variable LPT vanes 88; and the third is the flow control mechanism 56F to control the third stream bypass flow path 56. It should be appreciated that other variable inlet and exit guide vanes may alternatively or additionally be utilized in the turbine sections 32, 34, 36 to further facilitate flow control. It should also be appreciated that other turbine architectures which, for example, include additional or fewer stages each with or without various combinations of variable or fixed guide vanes.

The variable LPT vanes 88 facilitate the performance match between the first stage fan section 22 and the second stage fan section 24 simultaneously to maintain engine inlet flow constant while modulating engine thrust as well as facilitate operation of the auxiliary fan 18. For example, each spool 42, 44, 46 may be provided with a respective variable turbine vane structure or a single variable turbine vane structure may be utilized with the low spool 42 as illustrated in the disclosed non-limiting embodiment to control the auxiliary fan 18. That is, for example, only the low pressure turbine may include the variable turbine vanes 88, while the HPT and IPT vanes are stationary.

For high power, the combustor section 30 fuel flow is increased, the variable LPT vanes 88 are closed, the flow control mechanism 56F is closed, and the third stream exhaust nozzle 62 is closed to maximize second stream bypass flow path 58 air flow and maximize core flowpath 60 airflow and maximize the pressure ratio of the first stage fan section 22 and the second stage fan section 24. This is the high specific thrust mode.

For cruise power, the combustor section 30 fuel flow is decreased, the variable LPT vanes 88 are opened, the flow control mechanism 56F is opened, the third stream exhaust nozzle 62 throat area is opened, and the auxiliary variable inlet guide vanes 106 are opened such that the high spool 46 runs relatively faster for a given fuel flow rate and the fan section 22 air flow and auxiliary fan 104 air flow are maximized. Running the high spool 46 faster increases the engine overall pressure ratio which is more efficient. Further, increased flow at a lower pressure ratio through the third stream exhaust nozzle 62 and the auxiliary fan nozzle 108 are relatively more efficient as a propulsor at cruise power.

Figure 3:
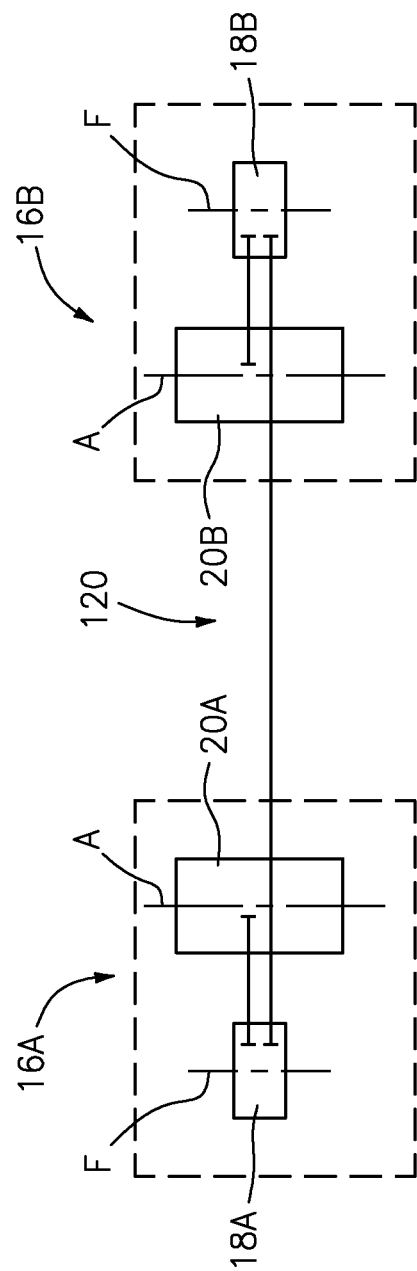
FIG. 3 is a general schematic view a propulsion system with a cross shaft arrangement for one engine inoperable operations.

With reference to FIG. 3, the propulsion system 14 according to another non-limiting embodiment may further include a cross-shaft arrangement 120 (illustrated schematically) between the port and starboard powerplant 16A, 16B assures aircraft performance under a one engine inoperable condition. The cross-shaft arrangement 120 may be between the port and starboard engines 20A, 20B, the port and starboard auxiliary fans 18A, 18B (shown) or both.

It should be appreciated that relative positional terms such as "forward," "aft," "upper," "lower," "above," "below," and the like are with reference to the engine but should not be considered otherwise limiting.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A propulsion system comprising:
   a first and a second gas turbine engine each comprising:
   a respective gas turbine longitudinal axis;
   a respective high pressure spool having a high pressure compressor and a high pressure turbine;
   a respective intermediate pressure spool having an intermediate pressure compressor and an intermediate pressure turbine;
   a respective low pressure spool having a first stage fan, a low pressure turbine, and a second stage fan downstream of the first stage fan;
   a respective core flow passage;
   a respective first bypass flow passage; and
   a respective second bypass flow passage, wherein each respective intermediate compressor is configured to provide a respective compressed fluid flow to each respective core flow passage, wherein each respective second stage fan is configured to provide a respective first bypass flow to each respective first bypass flow passage, and wherein each first stage fan is configured to provide a respective second bypass flow to each respective second bypass flow passage;
   a first and a second auxiliary spool having:
   a respective auxiliary spool longitudinal axis;
   a respective auxiliary fan, wherein each respective auxiliary fan is driven by the respective auxiliary spool, wherein the respective auxiliary spool longitudinal axis of the first and second auxiliary spools are laterally displaced from and parallel to the gas turbine longitudinal axis of the first and second gas turbine engines respectively;
   a first and a second cross shaft, wherein the first cross shaft is geared between the first auxiliary spool and the intermediate pressure spool of the first gas turbine engine, and the second cross shaft is geared between the second auxiliary spool and the intermediate pressure spool of the second gas turbine engine; and
   a third cross shaft geared between the first and second gas turbine engines.

2. The propulsion system as recited in claim 1, wherein said first gas turbine engine and said auxiliary fan of said first auxiliary spool are located on one of a port side and a starboard side of an aircraft.

3. The propulsion system as recited in claim 1, wherein said auxiliary fan of said first auxiliary spool is powered exclusively by said first gas turbine engine.

4. The propulsion system as recited in claim 1, wherein said auxiliary spool longitudinal axis of said first auxiliary spool is free of a compressor, a combustor, or a turbine.

5. A method of operating a propulsion system according to claim 1 comprising:
powering the auxiliary fan of the first auxiliary spool with the first gas turbine engine.

6. The method as recited in claim 5, further comprising: modulating a variable turbine inlet guide vane of the first gas turbine engine to performance match the first first stage fan of the first gas turbine engine and the intermediate pressure compressor of the first gas turbine engine to maintain a generally constant air intake to the first engine while varying a first engine thrust.

7. A method as recited in claim 5, further comprising:
modulating a variable low pressure turbine inlet guide vane of low pressure spool of the first gas turbine engine to performance match the first stage fan of the first gas turbine engine and the intermediate pressure compressor of the first gas turbine engine to maintain a generally constant air intake to the first engine while varying a first engine thrust.

* * * * *

UNITED STATES PATENT AND TRADEMARK OFFICE
CERTIFICATE OF CORRECTION

PATENT NO.        : 9,188,083 B2                                    Page 1 of 1
APPLICATION NO.   : 13/283649
DATED             : November 17, 2015
INVENTOR(S)       : Kupratis It is certified that error appears in the above-identified patent and that said Letters Patent is hereby corrected as shown below:

IN THE CLAIMS:

Claim 6, column 7, line 13: after "first" delete "first"

Claim 7, column 7, line 20: insert --the-- prior to "pressure"

Signed and Sealed this
First Day of March, 2016

Michelle K. Lee
*Director of the United States Patent and Trademark Office*